(12) United States Patent
Mostow (10) Patent No.: US 8,209,658 B2
(45) Date of Patent: Jun. 26, 2012

(54) METHOD OF CREATING SIGNATURES FOR CLASSIFYING PROGRAM FAILURES

(75) Inventor: Mark Alan Mostow, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/391,467

(22) Filed: Feb. 24, 2009

(65) Prior Publication Data

US 2010/0218049 A1 Aug. 26, 2010

(51) Int. Cl.
 *G06F 11/07* (2006.01)
(52) U.S. Cl. .................. 717/100; 714/38; 714/E11.024; 714/E11.029
(58) Field of Classification Search .................. 717/100; 714/38, E11.024, E11.029
See application file for complete search history.

(56) References Cited

U.S. PATENT DOCUMENTS

| | | | |
|---|---|---|---|
| 5,655,072 A * | 8/1997 | Wolff | 714/25 |
| 7,333,962 B2 * | 2/2008 | Zen | 706/15 |
| 2004/0194054 A1 * | 9/2004 | McGrath et al. | 717/100 |
| 2005/0257086 A1 * | 11/2005 | Triou et al. | 714/25 |
| 2009/0265681 A1 * | 10/2009 | Beto et al. | 717/100 |
| 2010/0088661 A1 * | 4/2010 | Langworthy et al. | 717/100 |

* cited by examiner

*Primary Examiner* — Don Wong
*Assistant Examiner* — Lynda Dinh
(74) *Attorney, Agent, or Firm* — Zaretsky & Associates PC (57) ABSTRACT

A novel and useful method of creating signatures for use in classifying failures of software programs in general and circuit design simulation tests in particular. Upon failure of a processor simulation test, the method of the present invention creates a signature comprising the sequence of source code commands executed shortly before the failure. The created signature, along with the reported error message together provides a functional grouping of the tests into groups of similar failures. After executing a suite of processor simulation test programs the resulting signatures are classified by their respective error messages and signatures. The results are then analyzed to pinpoint any program errors, or (in the case of processor design tests) design flaws causing the simulation test failures.

20 Claims, 5 Drawing Sheets

METHOD OF CREATING SIGNATURES FOR CLASSIFYING PROGRAM FAILURES

FIELD OF THE INVENTION

The present invention relates to the field of software testing processor design verification, and more particularly relates to a method of processor design verification by creating an executed instruction sequence signature prior to a computer program failure.

SUMMARY OF THE INVENTION

There is thus provided in accordance with the invention, a method of defining a test failure signature of an executed computer program, the computer program failing to terminate normally, the method comprising the steps of detecting an error message resulting from the executed computer program failing to terminate normally, identifying a series of one or more object code instructions executed prior to the failure of the executed computer program and matching each series of executed object instructions to its associated source code instruction.

There is also provided in accordance of the invention, a computer program for defining a test failure signature of an executed computer program, said computer program failing to terminate normally, comprising a computer usable medium having computer usable code embodied therewith, the computer program product comprising computer usable code configured for detecting an error message resulting from the executed computer program failing to terminate normally, computer usable code configured identifying a series of one or more object code instructions executed prior to the failure of the executed computer program and computer usable code configured matching each series of executed object instructions to its associated source code instruction.

There is further provided a method of defining a test failure signature of an executed computer program, the execution of said computer program terminating while in an infinite loop, the method comprising the steps of identifying a series of object code instructions executed in a single iteration of the infinite loop and matching each series of executed object instructions to its associated source code instruction.

There is also provided a method defining a test failure signature of an executed computer program, the execution of the computer program terminating after executing a jump instruction to an error label in the computer program, the method comprising the steps of identifying a series of one or more object code instructions executed prior to the jump to an error label and matching each series of executed object instructions to its associated source code instruction.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document:

| Term | Definition |
| --- | --- |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| RAM | Random Access Memory |
| RF | Radio Frequency |
| ROM | Read Only Memory |
| URL | Uniform Resource Locator |
| WAN | Wide Area Network |

DETAILED DESCRIPTION OF THE INVENTION

The present invention is a method of creating signatures used to classify failures of processor design simulation tests. Upon failure of a processor simulation test, the method of the present invention creates a signature comprising source code for the sequence of instructions (assembly language, low level programming language or high level programming language) executed immediately prior to the failure. The created signature, along with the reported error message, provides a functional grouping of the tests into groups of similar failures. Debugging one test from each of group of failures enables debugging the processor design.

After running a suite of processor simulation test programs, the test failures are classified by their respective error messages and signatures. The results are then analyzed to help pinpoint any design flaws causing the simulation test failures. The present invention is operative to aid in the design and debugging of both single and multiprocessor circuit designs. In addition to processor design, the present invention is a useful method for both detecting design flaws in complex software systems and for classifying and resolving software program failures.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
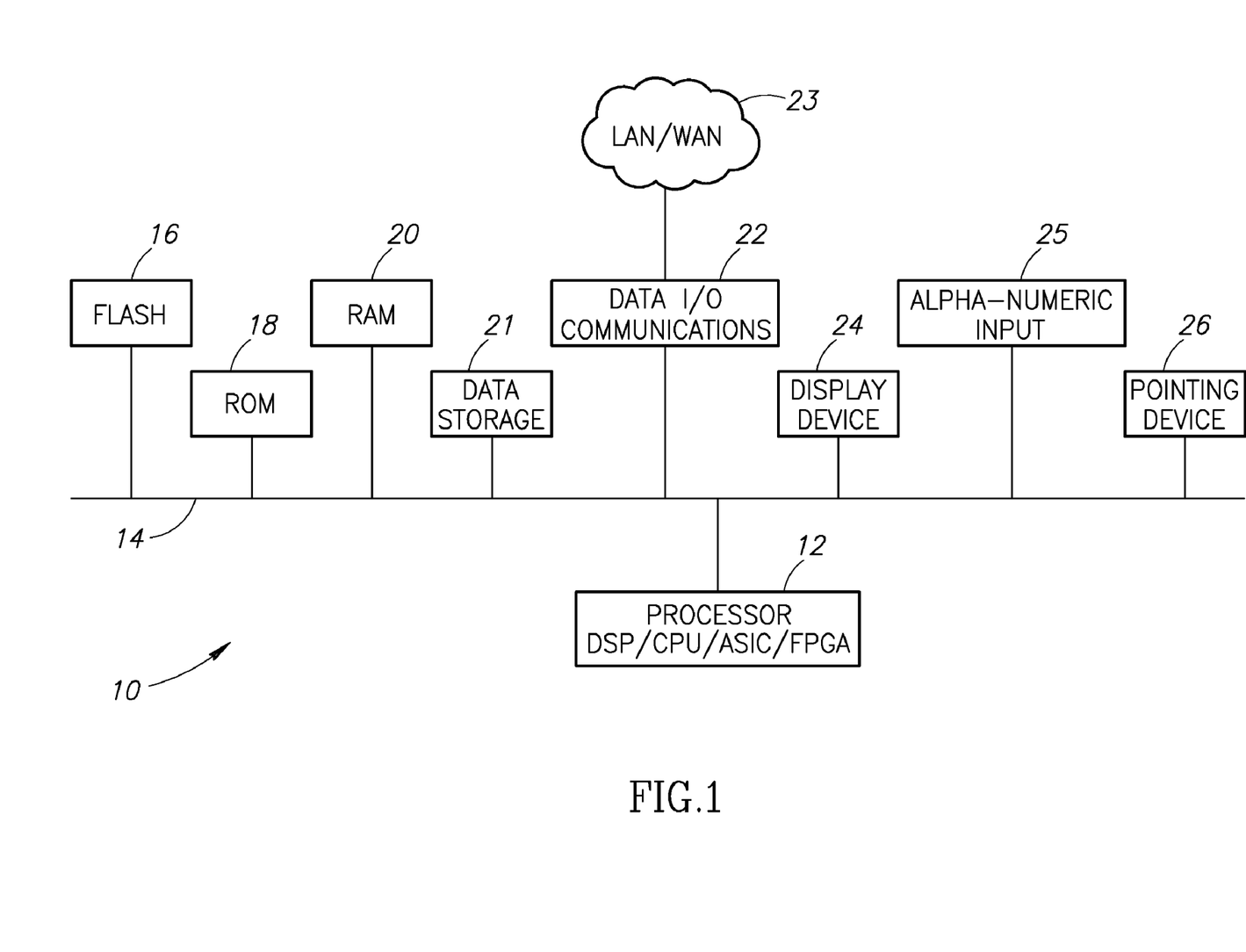
FIG. 1 is a block diagram illustrating an example computer processing system adapted to implement the processor design test failure signature creation method of the present invention.

A block diagram illustrating an example computer processing system adapted to implement the data processor design test failure signature creation method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the processor design test failure signature creation method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the processor design test failure signature creation method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the processor design test failure signature creation method of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Processor Design Test Failure Signature Creation Method

In accordance with the invention, a suite of software simulation test programs are executed to verify the design of a circuit comprising one or more processors. For each test which fails, a list (in a file or in a data structure of a computer program or script) is created comprising all machine code instructions which were executed in the course of the test, in the order of their execution. The machine code instruction information is obtained from the test engine executing the test (details of this step are dependent on the specifics of the particular verification environment). Aside from the executed machine code instruction, the program counter and any other data needed to locate the corresponding instruction in the source code compiled to create the executed machine code are stored as well.

Using the collected information, the source code command corresponding to the machine code instruction is identified as it appears in the original source code file which generated the executable program, or in the listing file of its compilation. While the executable program comprises a series of machine code instructions, the source code file comprises a program written in either (but not limited to) assembly language, a low level computer programming language or a high level computer programming language. The corresponding source code may contain useful labels such as Error1 and corresponding instructions Jump To Error1. If this type of label and jump instruction are found in the source code, they are used to assist in classifying the program execution failure.

After the source code commands are identified and stored in a list, the source code commands are preprocessed into a canonical form, thereby converted to a standard form to aid with source code comparison. For example, the assembly language command Line 123: Add C, 0xFFF is preprocessed to Add C, 0xFFF In this example, any line numbers are removed, since the same code sequence can occur at different locations (i.e. line numbers) in either different source code files or different versions of the same source code file. In addition, multiple spaces are reduced to single spaces. Additional examples of preprocessing include omitting comments and leading and trailing blanks.

After preprocessing the list of source code commands, the end of the sequence of executed machine code instructions is examined to determine if the test ended while repeatedly executing the same sequence of machine code more than a certain configurable number of times, (e.g., 500). The test is terminated because it reached a maximum number of cycles or executed instructions. In this case, the termination is designated to be due to an infinite loop, and the list of last executed source code instructions comprises the list of source code instructions executed in a single iteration of the loop, starting with earliest occurring source code instruction in the source code file.

In the case where the software simulation test terminates prematurely (i.e. the test failed, but not due to an infinite loop), the first executed source code instruction is found (if any), which has a conditional or unconditional jump to a label containing a key word such as Error or Fail, when that jump is actually performed during execution. Detecting whether or not the jump was actually taken is determined by checking either the program counter of the next instruction executed or its relative position in the source code or its compilation listing. Details of this step depend on the naming convention used in the tests to denote failing conditions. In this case, the list of last commands is defined to be the last specified number of source code commands executed (e.g., 10, but this number is configurable) leading up to the jump to error.

In the case where the termination of the failing software simulation test was neither due to an infinite loop nor a jump to a label designating an error or failure, the list of last commands is defined to be a specific number of source code commands executed at the end of the test.

In all the cases discussed supra (i.e. infinite loop, termination with an error label or termination without an error label) the list of last commands is written to a file for that test and stored as a multi-line string in a database of all test failures. The list of last commands contains only source code commands, not program counters or other information which varies from test to test.

After running the suite of processor test simulations, all test failures are then listed, grouped first by first error message, then by the list of last commands. Alternatively, the test failures are displayed in a graphical user interface, adding a unique short code name (e.g. LastCmds0031) for each distinct value of the list of last commands. This enables grouping together test failures by the first error message and same code name. When the user clicks on the code name, the actual list of last commands is then displayed.

Figure 2:
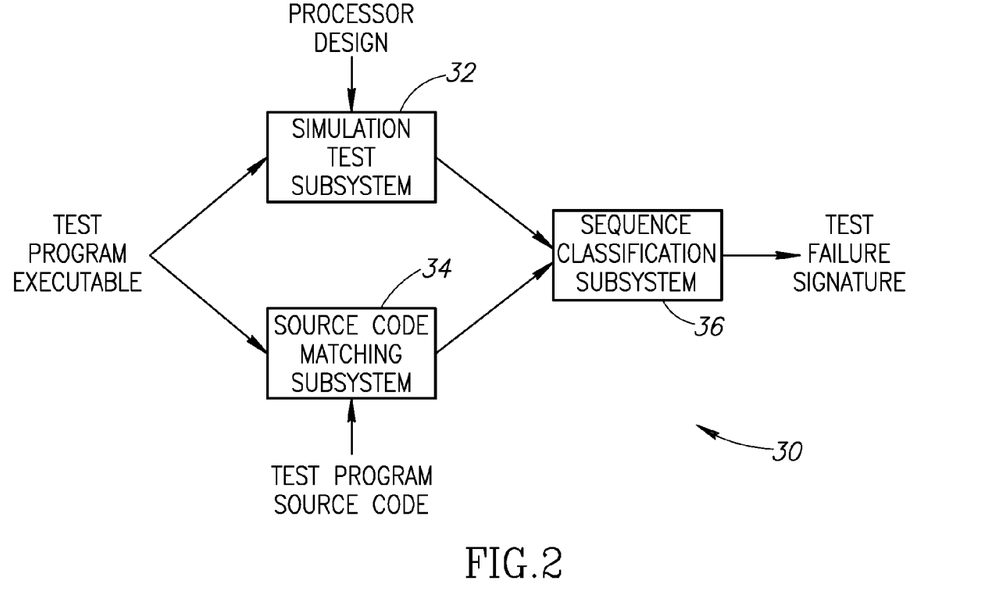
FIG. 2 is a block diagram illustrating an example computer system suitable to implement the processor design test failure signature creation method of the present invention.

A block diagram illustrating an example computer suitable for use with the present invention is shown in FIG. 2. The block diagram, generally referenced 30, comprises simulation test subsystem 32, source code matching subsystem 34 and sequence classification subsystem 36.

In operation, both the processor design and simulation test program executable files are loaded to the simulation test subsystem. Results from the simulation test, including the executed instruction log file and any error messages are sent to the sequence classification subsystem. The simulation test program executable and source code files are sent to the source code matching subsystem, where a mapping is created between the source and executable code files, including any labels (e.g., jump to on error labels) in the source code. The matched source and executable files are then sent to the sequence classification system, which then uses the simulation test results and mapped source code to create a test failure signature.

Figure 3:
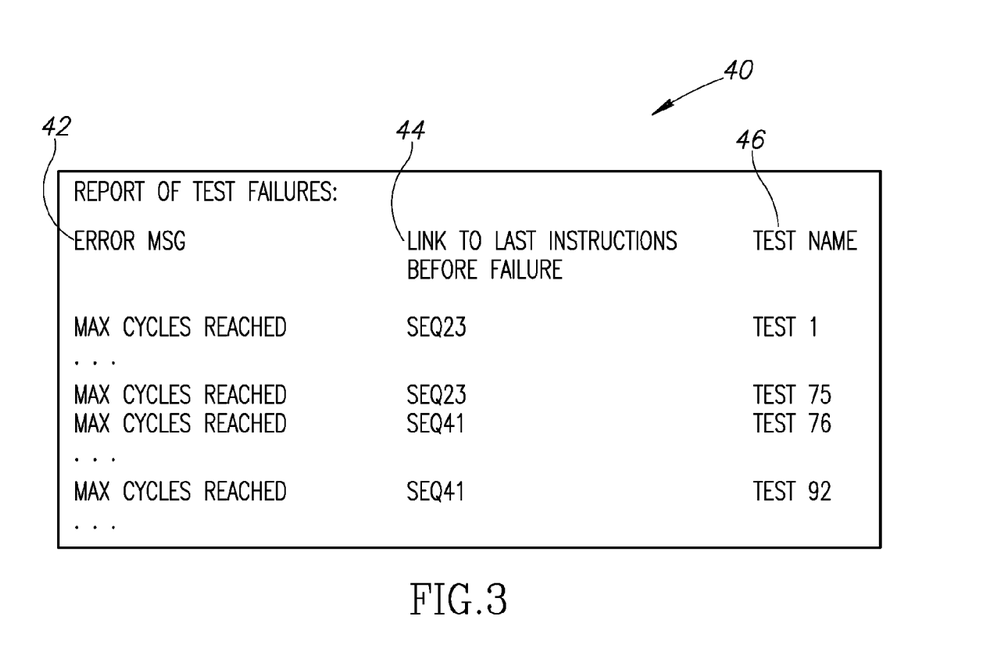
FIG. 3 is an example of a log file comprising signatures created by the processor design test failure signature creation method of the present invention.

An example of output generated by a computer system implementing the method of the present invention is shown in FIG. 3. The report generally referenced 40 comprises columns for error messages 42, sequence of executed instructions before simulation test program failure 44, and test program name 46. For example, the first report entry shows an error message of Max cycles reached, indicating an infinite loop. The unique signature that was detected by the method of the present invention prior to the program failure was Seq23, which was located in program Test 1.

Figure 4:
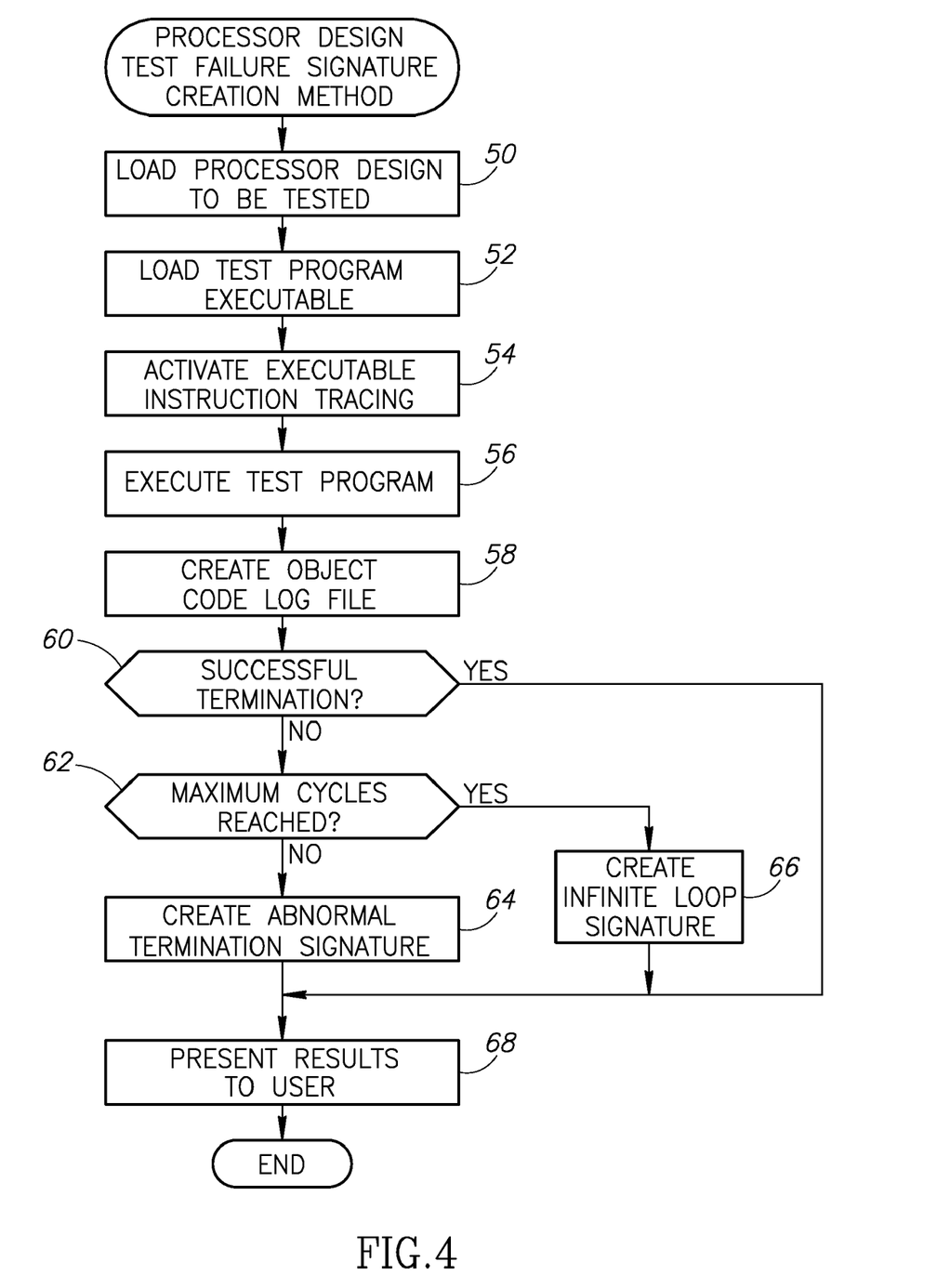
FIG. 4 is a flow diagram illustrating the processor design test failure signature creation method of the present invention.

A flow diagram illustrating the delayed processor design test failure signature creation method of the present invention is shown in FIG. 4. First the processor design file defining the processor to be tested is loaded (step 50). Next, the processor simulation test executable file is loaded (step 54), instruction tracing is activated (step 56), the processor simulation test is executed (step 56) and an object code log file is created (step 58). If the processor simulation test completes successfully (step 60), then the results are presented to the user (step 68). If the processor simulation test does not complete successfully and an infinite loop was detected, typically by receiving a Max Cycles Reached error message (step 62) then an infinite loop signature is created (step 66) and the method of the present invention continues with step 68. If the processor simulation test does not complete successfully and an infinite loop was not detected then an abnormal termination signature is created (step 64), and the method of the present invention concludes with step 68.

Figure 5:
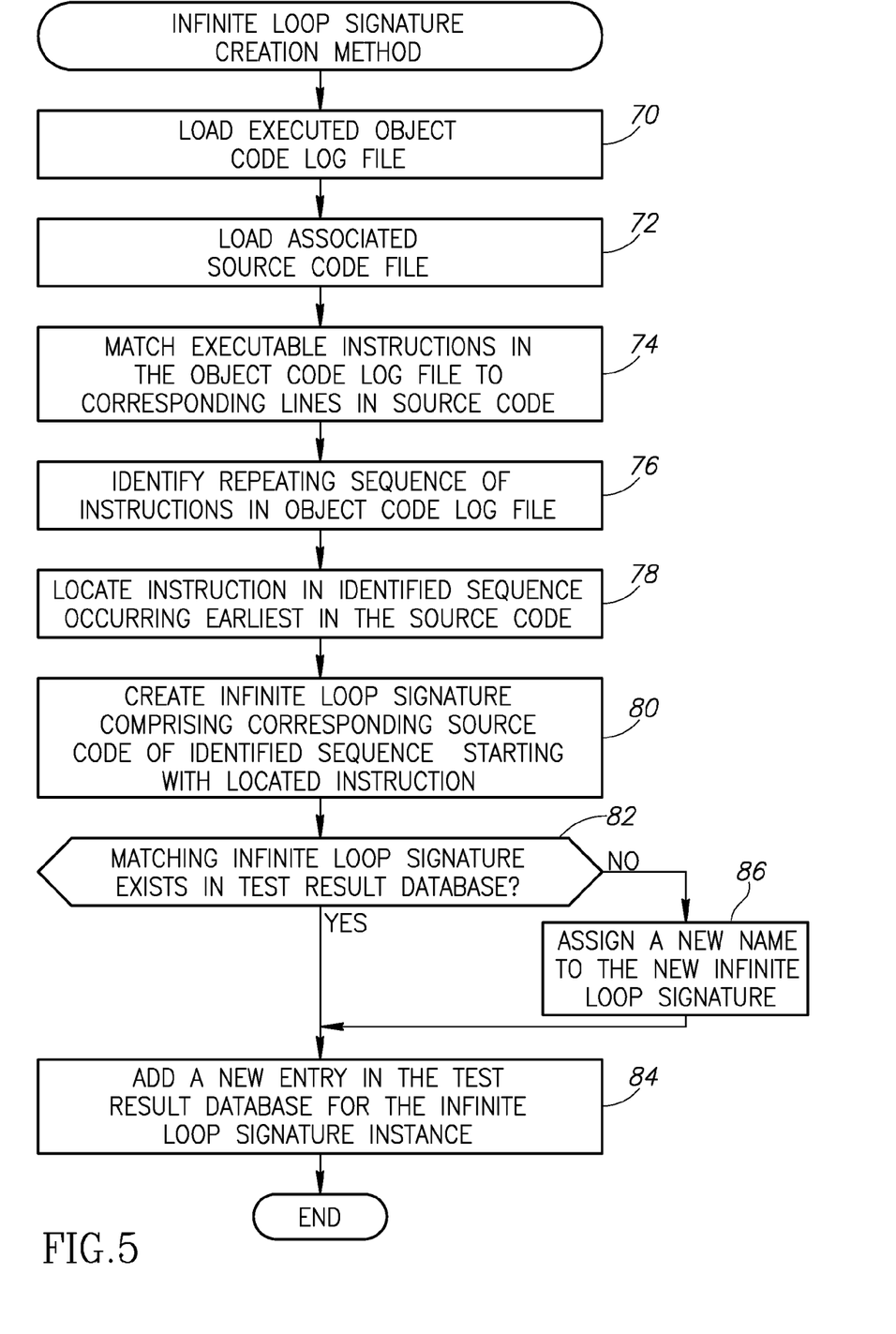
FIG. 5 is a flow diagram illustrating the infinite loop signature creation method of the present invention.

A flow diagram illustrating the infinite loop signature creation method of the present invention is shown in FIG. 5. First, the object code log file is loaded (step 70) and is associated source code file is also loaded (step 72). Executable instructions in the object code log file are then matched to their corresponding source code commands in the source code file (step 74). A repeating sequence of instructions in the object code log file is identified (step 76) and the instruction in the sequence with the lowest address is located (step 78). An infinite loop signature is created comprising the corresponding source code of the identified sequence starting with the located lowest address instruction (step 80). If a matching infinite loop signature already exists in the test result database (step 82) then a new entry in the test result database is added for the infinite loop signature instance (step 84). If no matching infinite loop signature was found in the test result database, then a new name is assigned to the created infinite loop signature (step 86), and the method of the present invention concludes with step 84.

Figure 6:
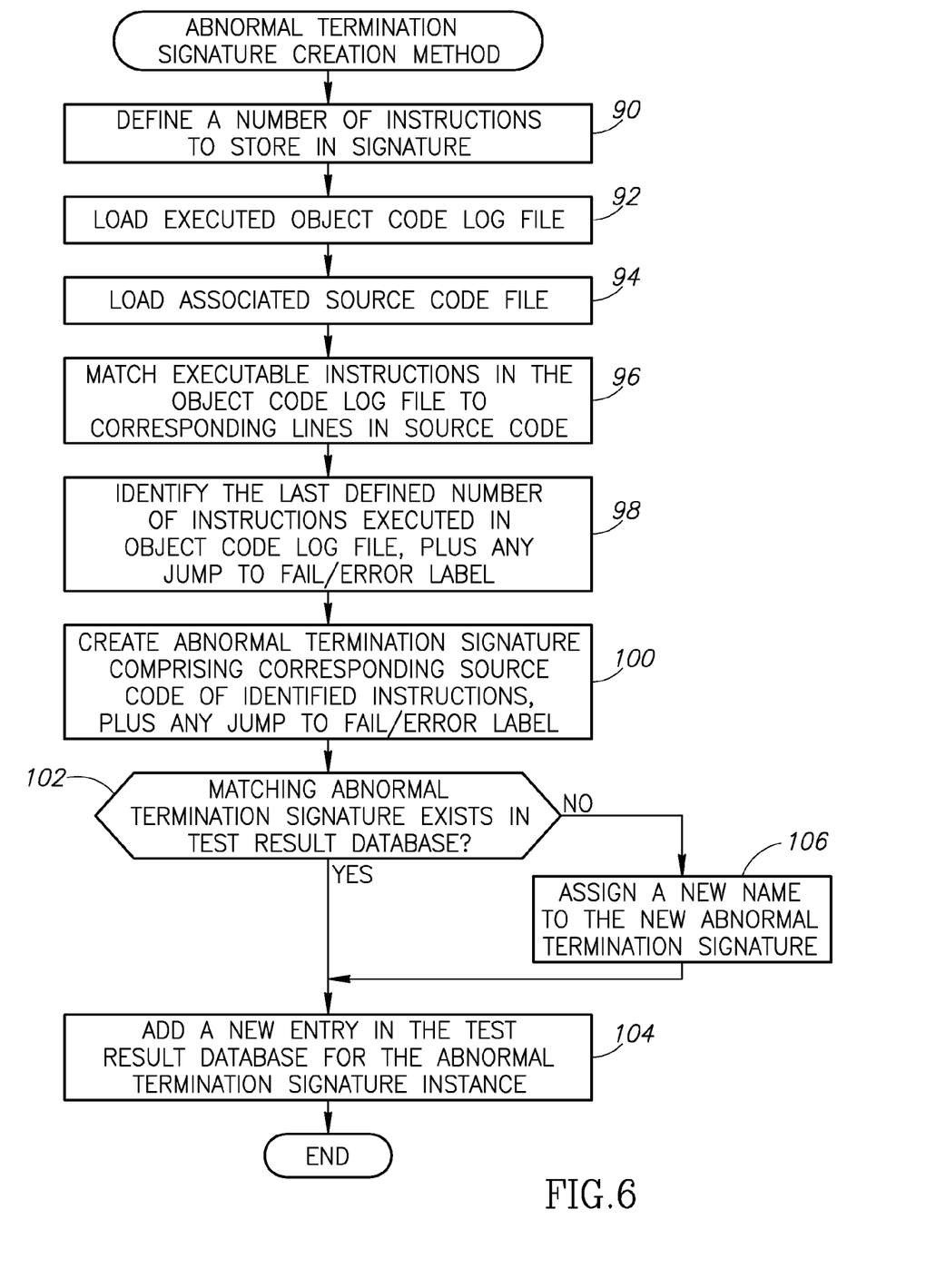
FIG. 6 is a flow diagram illustrating the abnormal termination signature creation method of the present invention.

A flow diagram illustrating the abnormal termination signature creation method of the present invention is shown in FIG. 6. First, the number of instructions to store in the signature (for example, 10) is defined (step 90). Then the object code log file is loaded (step 92) and is associated source code file is also loaded (step 94). Executable instructions in the object code log file are then matched to their corresponding source code commands in the source code file (step 96). The last (i.e. the defined number of) instructions in the object code log file are identified, ending at the first jump to fail or jump to error label taken (if one exists), or at the end of the test, otherwise (step 98). An abnormal termination signature is then created comprising the corresponding source code of the identified instructions, plus any jump to error or jump to fail label (step 100). If a matching abnormal termination signature already exists in the test result database (step 102) then a new entry is added for this abnormal termination signature instance (step 104). If no matching abnormal termination signature already exists in the test result database, then a new name is assigned to the created abnormal termination signature (step 106), and the method of the present invention concludes with step 104.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of defining a test failure signature of an executed computer program failing to terminate normally, the method comprising the steps of:

detecting an error message resulting from said executed computer program failing to terminate normally;

identifying a series of one or more object code instructions executed prior to said failure of said executed computer program; and matching each said series of executed object code instructions to its associated source code instruction wherein said associated source code instruction is from the group consisting of an assembly language instruction, a low level programming instruction and a high level programming instruction; and wherein said associated source code instruction is preprocessed into a canonical form.

2. The method according to claim 1, wherein said detected error message comprises detection of an infinite loop.

3. The method according to claim 2, wherein test failure signature comprises source code associated with said series of object code instructions executed in a single iteration of said infinite loop.

4. The method according to claim 3, wherein first said object code instruction of said infinite loop comprises said object code instruction occurring said first within source code file.

5. The method according to claim 1, wherein said detected error message comprises a jump to an error label.

6. The method according to claim 1, wherein a defined maximum number of associated source code instructions is associated with said test failure signature.

7. The method according to claim 1, wherein each observed instance of said test failure signature is stored in a log file, each record of said log file comprising:
   a unique name for said test failure signature;
   said detected error message; and
   an identity of said executed computer program.

8. A computer program product for defining a test failure signature of an executed computer program failing to terminate normally, comprising:
   a non-transitory computer usable medium having computer usable code embodied therewith, the computer program product comprising:
   computer usable code configured for detecting an error message resulting from said executed computer program failing to terminate normally;
   computer usable code configured identifying a series of one or more object code instructions executed prior to said failure of said executed computer program; and
   computer usable code configured matching each said series of executed object code instructions to its associated source code instruction
   wherein said associated source code instruction is from the group consisting of an assembly language instruction, a low level programming instruction and a high level programming instruction; and
   wherein said associated source code instruction is preprocessed into a canonical form.

9. The computer program product according to claim 8, wherein said detected error message comprises detection of an infinite loop.

10. The computer program product according to claim 9, wherein test failure signature comprises source code associated with said series of object code instructions executed in a single iteration of said infinite loop.

11. The computer program product according to claim 10, wherein first said object code instruction of said infinite loop comprises said object code instruction occurring said first in source code file.

12. The computer program product according to claim 8, wherein said detected error message comprises jump to an error label.

13. The computer program product according to claim 8, wherein a defined maximum number of said associated source code instruction is associated with said test failure signature.

14. The computer program product according to claim 8, wherein each observed instance of said test failure signature is stored in a log file, each record of said log file comprising:
   a unique name for said test failure signature;
   said detected error message; and
   an identity of said executed computer program.

15. A method of defining a test failure signature of an executed computer program terminating while in an infinite loop, the method comprising the steps of:
   identifying a series of object code instructions executed in a single iteration of said infinite loop; and
   matching each said series of executed object code instructions to its associated source code instruction
   wherein said associated source code instruction is from the group consisting of an assembly language instruction, a low level programming instruction and a high level programming instruction; and
   wherein said associated source code instruction is preprocessed into a canonical form.

16. The method according to claim 15, wherein first said object code instruction of said infinite loop comprises said object code instruction occurring said first in source code file.

17. The method according to claim 15, wherein each observed instance of said test failure signature is stored in a log file, each record of said log file comprising:
   a unique name for said test failure signature;
   said detected error message; and
   an identity of said executed computer program.

18. A method of defining a test failure signature of an executed computer program terminating after executing a jump instruction to an error label in said computer program, the method comprising the steps of:
   identifying a series of one or more object code instructions executed prior to said jump to an error label; and
   matching each said series of executed object instructions to its associated source code instruction
   wherein said associated source code instruction is from the group consisting of an assembly language instruction, a low level programming instruction and a high level programming instruction; and
   wherein said associated source code instruction is preprocessed into a canonical form.

19. The method according to claim 18, wherein a defined maximum number of associated source code instructions is associated with said test failure signature.

20. The method according to claim 18, wherein each observed instance of said test failure signature is stored in a log file, each record of said log file comprising:
   a unique name for said test failure signature;
   said detected error message; and
   an identity of said executed computer program.

* * * * *